J. C. SIKES.
MULSHER.
APPLICATION FILED OCT. 28, 1914.
1,150,638.
Patented Aug. 17, 1915.
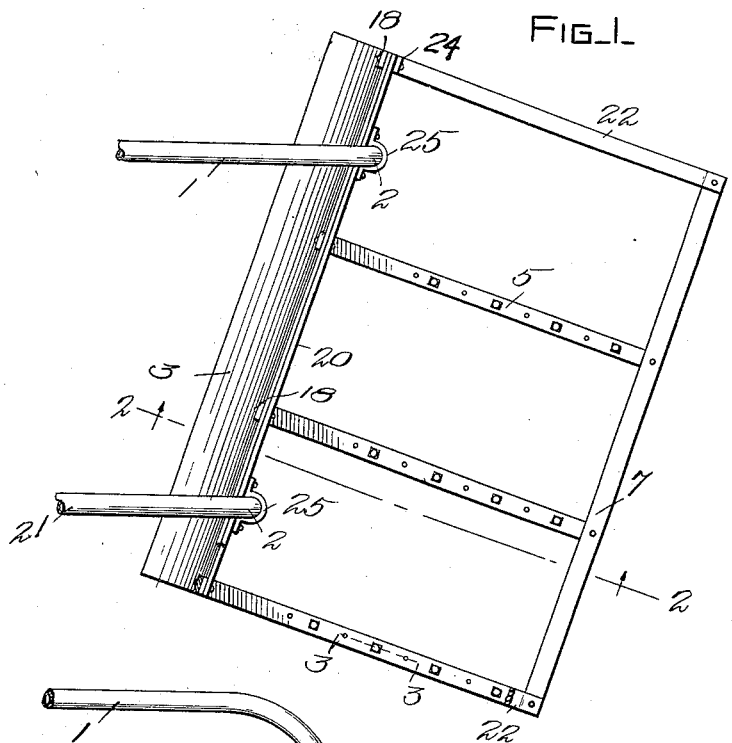
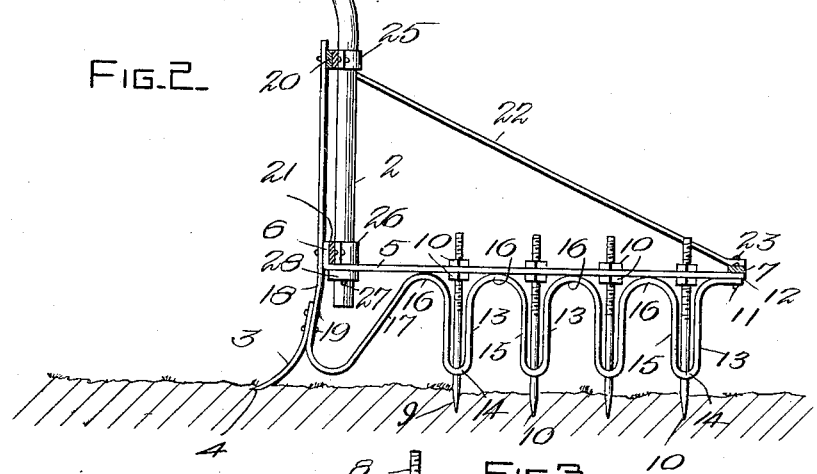
WITNESSES
J. V. Phillips
C. E. Trainor
INVENTOR
Jonas C. Sikes
BY Munn & Co.
ATTORNEYS

UNITED STATES PATENT OFFICE.

JONAS CHRISTOPHER SIKES, OF GREENVILLE, TEXAS, ASSIGNOR OF ONE-HALF TO JAMES J. DARNELL, OF GREENVILLE, TEXAS.

MULSHER.

1,150,638. Specification of Letters Patent. Patented Aug. 17, 1915.

Application filed October 28, 1914. Serial No. 868,976.

*To all whom it may concern:*

Be it known that I, JONAS C. SIKES, a citizen of the United States, and a resident of Greenville, in the county of Hunt and State of Texas, have made certain new and useful Improvements in Mulshers, of which the following is a specification.

My invention is an improvement in mulshers, and has for its object to provide a device of the character specified, especially designed for cultivating growing crops with plants in rows, such for instance as corn, cotton and the like, wherein a blade is provided for cutting the weeds and the like below the surface of the ground, and arranged to throw the soil toward the row, thus hilling the plants, as well as destroying the weeds, and wherein means are provided in connection with the blade and coöperating therewith, for preparing and leaving a blanket or mulsh of fine soil on the surface, for preventing the escape of the moisture from the ground, and for retaining the moisture for the use of the growing plants.

In the drawings, Figure 1 is a top plan view of the improved mulsher, and Figs. 2 and 3 are sections on the lines 2—2 and 3—3, respectively, the former looking in the direction of the arrow adjacent to the line.

The improved mulsher is designed to be attached to the feet of a cultivator, and to be drawn through the field by the cultivator, and the device is shown connected to the feet. Each of the said feet comprises an approximately horizontal portion 1 and an integral approximately vertical portion 2, and the mulsher comprises a blade 3 transversely arched as shown, so that the edges of the blade are at an obtuse angle with respect to each other.

The lower edge of the blade is beveled to form a cutting edge, as indicated at 4, and near its other edge the blade is secured to a supporting frame to be described. This frame comprises a series of bars 5, arranged in parallel spaced relation, and each bar is provided at its front end with an upturned right angle lug 6. At their rear end the bars are connected by a cross bar 7, and the teeth 8 are connected with the bar, each bar having a series of the teeth connected thereto. Each of the teeth has its lower end pointed, as indicated at 9, and the upper end is threaded, and is passed through an opening in the bar.

Lock nuts 10 are threaded on to the tooth above and below the bar, to hold the tooth in adjusted position, and it will be obvious that by means of the nuts the teeth may be adjusted vertically with respect to the bar, and may be held in adjusted position by the nuts. The teeth of each bar are braced against the bars, near their lower pointed end, by means of a sinuous brace, each brace being connected to the adjacent bar, to the blade, and to other elements to be later described. Each of the braces is connected at its rear end to the adjacent bar 5, being lapped upon the end face of the bar, and connected to the bar by means of a rivet 11 or the like, the lapped portion of the brace being indicated at 12.

Near the rearmost tooth, the brace is bent downward in rear of the tooth, as indicated at 13, and then forward, as indicated at 14, and upward, as indicated at 15 in front of the tooth, to the bar 5, upon whose under face the brace is lapped, as shown at 16, and is secured to the bar in any suitable manner. Each of the sinuous braces therefore, provides a substantially U-shaped brace for each tooth, one arm of each U-shaped brace being in rear of the tooth and the other in front of the tooth, while the body 14 is provided with an opening through which the tooth extends.

The portions 16 of each sinuous brace are secured to the adjacent bar 5 between adjacent teeth, and all of the teeth are thus strongly braced against forward or rearward lateral movement. In front of the foremost tooth after its connection with the bar 5 in front of the said tooth each sinuous brace is bent downwardly and forwardly, as indicated at 17, and thence upwardly, as indicated at 18, well above the plane of the bars 5. The upper edge of the blade is secured to the portions 18 of the sinuous braces, just below the bars 5, by means of rivets 19 or the like, and the portions 18 of all of the braces are connected at their upper ends, by means of a cross bar 20, all of the said portions 18 being secured to the cross bar.

A cross bar 21 connects the lug 6 of all the bars 5 in rear of the said lugs, and the portion 18 of each sinuous brace is connected to the lug 6 of the adjacent bar 5, and also to the cross bar 21. Inclined braces 22 are arranged between the ends of the cross bar 20, and the ends of the cross bar 7, each brace being lapped on the cross bar 7 at its rear end, and secured thereto, as indicated at 23, while at its front end each of the said braces has an upturned lug 24 which is lapped upon the rear face of the cross bar 20, and is secured thereto by a rivet or the like. The portions 2 of the feet of the cultivator are held in bearings 25 and 26 on the rear face of the cross bar 20, and on the rear face of the cross bar 21 respectively.

Pins 27 are passed transversely of the feet below the bearings 26 and collars 28 encircle the feet between the pins and the said bearings. The teeth it will be noticed are threaded for a considerable portion of their length, so that they may be adjusted vertically for a considerable distance, and the bends, that is the portions 14 of the sinuous braces are well below the bars 5, and near the points of the teeth, so that the braces brace the teeth perfectly against lateral movement rearwardly or forwardly.

Each bar 5 is shown as provided with four teeth, although it is obvious that the number might be increased or diminished if found advisable for any reason. The width of the blade 3 will vary in accordance with conditions, the wider the blade the greater the quantity of soil that is thrown toward the row at each passage of the blade, and when it is found desirable to throw a large amount of dirt the blade will be of considerable width. On the other hand if but a small amount of dirt is desired to be thrown, the blade will be narrow.

It will be noted from an inspection of Fig. 1, that the horizontal portion of one of the feet of the cultivator is of greater length than the horizontal portion of the other foot, so that one end of the cutting edge of the blade is held in rear of the other end. Since the bars 5 are approximately perpendicular to the upper edge of the blade, the said bars will extend rearwardly from the blade at an obtuse angle, and this arrangement prevents the teeth of a bar from cutting in the same groove or furrow, insuring that the teeth of each bar will cut alongside of each other, making four cuts or furrows instead of one. The bars 5 are of such length, and the inclination of the blade is such, that the rearmost tooth 18 of the first bar at the top of Fig. 1 will cut a furrow spaced apart from the first tooth of the second bar, the same distance that the last tooth of the first bar is spaced from the next to the last tooth of the said bar.

In use the machine forming the subject matter of the invention takes the place of the cultivating blades of a cultivator or double shovel. These blades are in the cultivator or double shovel connected with the feet and to use the mulsher the blades are removed and replaced by the frame. When the machine is drawn through the field, the cutting edge of the blade will run below the surface of the ground, cut weeds below the surface, and part of the dirt will be thrown to the row passing off the end of the blade. The remainder of the dirt will move upward on the blade and will pass upward over the upper edge of the blade, to the rear thereof. The teeth are so arranged, that they will thoroughly pulverize the top of the soil, and the loose dirt thrown over the blade, and will fill up any cracks or openings that there may be in the ground, covering the ground with a blanket of finely pulverized soil. This blanket will conserve the moisture in the soil, preventing its escape or evaporation, and retaining it for the use of growing plants.

I claim:

1. A mulsher comprising a frame consisting of spaced parallel bars, cross bars connecting the front and the rear ends of the said bars, a series of teeth for each bar, each bar having openings for the teeth, and the said teeth having their upper ends threaded and the threaded portions being passed through the openings, lock nuts above and below the bars for holding the teeth in adjusted position, a sinuous brace for each bar, each brace being connected at its rear end to the rear end of the bar, and each brace having at each tooth a substantially U-shaped portion depending in front and behind the tooth and having an opening through which the tooth extends at its lower end, each brace being connected to the bar between adjacent teeth, each of the said braces being bent downwardly at its front end and then upward above the frame at the front thereof, a cross bar connecting the upper ends of the said braces, a cross bar connecting said braces at the first-named bars and secured to the said bars, a blade connected to the braces at the lower ends of the upwardly bent portions of the front ends thereof, inclined braces at the ends of the frame between the rear cross bar and the cross bar connecting the upper ends of the braces, and pairs of vertically alined bearings on the cross bars connecting the upwardly bent portions of the braces.

2. A mulsher comprising a blade curved transversely and arranged with its concave face forwardly, a frame at the upper edge of the blade and extending rearwardly therefrom, said frame comprising spaced parallel bars arranged perpendicular to the blade, each bar having at its front end an upstanding lug, a cross bar connecting the lugs, a cross bar connecting the rear ends of the bars, a series of teeth connecting with each bar, each bar having spaced openings, and the teeth being threaded at their upper ends and passing through the openings, lock nuts threaded on to the teeth above and below the bars, means below the bars and connected therewith for bracing the teeth, said means having upstanding arms at their front ends, and the blade being connected to the upstanding arms, cross bars connected with the arms, and bearings on the cross bars.

3. A mulsher comprising a blade curved transversely and arranged with its concave face forwardly, a frame at the upper edge of the blade and extending rearwardly therefrom, said frame comprising spaced parallel bars arranged perpendicular to the blade, each bar having at its front end an upstanding lug, a cross bar connecting the lugs, a cross bar connecting the rear ends of the bars, a series of teeth connected with each bar, means for connecting the teeth to the bars, means below the bars and connected therewith for bracing the teeth, said means having upstanding arms at their front ends, and the blade being connected to the upstanding arms, cross bars connected with the arms, and bearings on the cross bars.

4. A mulsher comprising a blade curved transversely and arranged with its concave face forwardly, and with its lower edge in advance of its upper edge, said lower edge being inclined rearwardly toward the row to be cultivated, a substantially rectangular frame extending rearwardly from the blade and connected with the upper edge thereof, and provided with bearings at the blade, and teeth connected with the frame, the frame having openings arranged in parallel series, each series being perpendicular to the upper edge of the blade, the frame having openings through which the teeth extend, and the teeth being threaded, nuts threaded on to the teeth above and below the frame, and means for bracing each series of teeth below the frame.

5. A mulsher comprising a blade curved transversely and arranged with its concave face forwardly, and with its lower edge in advance of its upper edge, said lower edge being inclined rearwardly toward the row to be cultivated, a substantially rectangular frame extending rearwardly from the blade and connected with the upper edge thereof, and provided with bearings at its front, and teeth connected with the frame, the frame having openings arranged in parallel series.

6. A mulsher comprising a blade curved transversely and arranged with its concave face forwardly, and with its lower edge in advance of its upper edge, said lower edge being inclined rearwardly toward the row to be cultivated, a substantially rectangular frame extending rearwardly from the blade and connected with the upper edge thereof, and provided with bearings at its front, and teeth connected with the frame.

JONAS CHRISTOPHER SIKES.

Witnesses:
J. A. MONEY,
W. J. HUMPHREYS.

Copies of this patent may be obtained for five cents each, by addressing the "Commissioner of Patents, Washington, D. C."